Aug. 19, 1924.  W. E. HEXAMER  1,505,891
REFRIGERATING SYSTEM
Filed Dec. 12, 1922
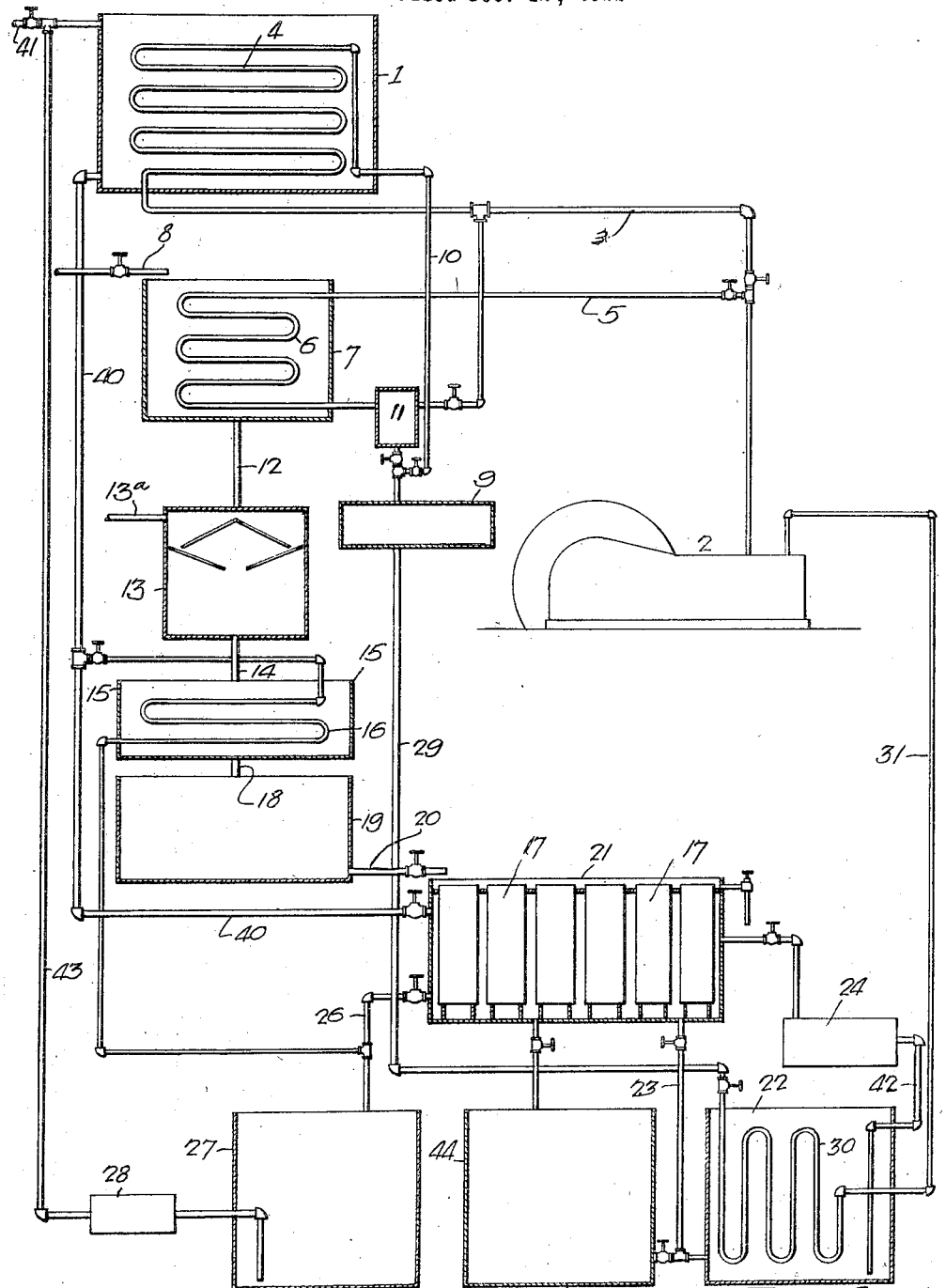

Patented Aug. 19, 1924.

1,505,891

UNITED STATES PATENT OFFICE.

WILLIAM E. HEXAMER, OF PHILADELPHIA, PENNSYLVANIA.

REFRIGERATING SYSTEM.

Application filed December 12, 1922. Serial No. 606,372.

*To all whom it may concern:*

Be it known that I, WILLIAM E. HEXAMER, a citizen of the United States, residing in Philadelphia, Pennsylvania, have invented Refrigerating Systems, of which the following is a specification.

One object of this invention is to provide a system of apparatus which shall include means for usefully employing the heat generated in compressing or present in gas under pressure and the invention more especially contemplates a novel arrangement of heat exchange apparatus whereby water requiring to have its temperature raised for purposes of deaeration shall be heated by ammonia or other refrigerant gas after this has been compressed, which shall thus be cooled.

The invention further contemplates a refrigerating system involving a relatively simple, compact and economical assemblage of apparatus in which the hot compressed refrigerant gas is cooled by water, which is thereby raised to the temperature necessary for its subsequent treatment in order to remove its contained air.

These objects and other advantageous ends I attain as hereinafter set forth, reference being had to the accompanying drawings, in which, The figure is a diagrammatic representation of one arrangement of apparatus constituting my system.

In the above drawing, 1 represents a condenser for ammonia or other refrigerant gas, which is compressed in a device 2 which may be either a compressor or a gas generator. This device 2 is connected through a pipe 3 with the coils or equivalent gas conductors 4 of the condenser 1 and this pipe is also connected through a pipe 5 with the coils or equivalent devices 6 in a heat exchanger 7 whose container may have water delivered to it from a suitable supply pipe or source 8. A receiver 9 for liquefied gas is connected by a pipe 10 to the coils 4 of the condenser 1 and is also connected through a trap 11 to the coils 6 of the heat exchanger 7.

The water containing compartment or container of the heat exchanger 7 through a pipe 12 is connected to a deaerating device 13 having any suitable construction for freeing the water delivered thereto from entrained or dissolved air, for which purpose its casing is connected by a conduit 13ᵃ to a suitable exhausting device (not shown).

Through a pipe 14 the deaerator is connected to deliver to the casing of a cooler 15 having coils or equivalent elements 16 through which said water circulates from a pipe 40 supplied from the casing of the condenser 1, which in turn is supplied with cooling water from a pipe 41.

From the cooler 15 a pipe 18 leads to a fore cooler 19 wherein the water may have its temperature still further lowered by any suitable means, although this may be omitted without departing from my invention. If thus employed the outlet of the fore cooler is connected through a pipe 20 to deliver water to the cans 17 or equivalent water containing members of the freezing tank 21. The space surrounding these cans in said tank is connected through a pipe 23 with a brine tank 22, to which is also connected the suction pipe 42 of a pump 24 for delivering said brine to the freezing tank 21. The water supply pipe 40 is also connected to the space in said tank surrounding the cans and from said tank a pipe 26 leads to a water storage tank 27, which is also connected to receive water from the coils 16 of the cooler. Water may be forced from said storage tank 27 through a pipe 43 to the supply pipe 41 by means of a pump 28.

A pipe 29 leads from the storage tank 9 for liquefied gas to suitable cooling coils 30 in the brine tank 22 and these coils are also connected through a pipe 31 with the inlet of the compressor or generator 2. A brine storage tank 44 is also preferably connected to the bottom of the tank 22 and is positioned to receive brine discharged from the freezing tank 21.

With the above described arrangement of apparatus it will be understood that the gas delivered from the compressor 2, by means of suitable valves, may be caused, in part or totally, to flow at will either to the condenser 1 or to the heat exchange 7. In any case it is liquefied and flows ultimately into the storage tank 9.

In accordance with my invention however a greater or less amount of the hot gas from the compressor passes to the coils 6 of the heat exchanger 7 where it is cooled and condensed by the water from the pipe 8. The proportion of heated gas flowing to the heat exchanger 7 is so regulated that the water therein is highly heated, for example, to a temperature of 220° F. and passes therefrom through the pipe 12 to the deaerator 13 where it is so treated as to be freed of dissolved or entrained air. It then passes through the pipe 14 into the cooler 15 where its temperature is reduced by the water delivered through the coils 16 and from this cooler it passes either directly to the cans in the freezing tank 21 or, if desired, its temperature is still further reduced in the fore cooler 19, after which it passes to said cans.

By suitably operating the pump 24, brine cooled to a low temperature by the expansion of liquid gas in the coils 30 is forced into the freezing tank 21, causing the water in the cans 17 to freeze. When the ice is formed, the brine is withdrawn from the tank 21 into the storage tank 40 or it may flow direct to the brine tank 22, after which water from the pipe 40 is admitted to the freezing tank 21 around the cans, which are thereupon so raised in temperature as to free the ice from their walls. The cakes of ice may now be removed and the water from said tank is delivered to the storage tank 27 from whence it may be forced by the pump 28 through the pipe 43 to the condenser.

From the above description it will be appreciated that I utilize in the heat exchanger 7 the heat taken from the hot compressed gas delivered by the compressor or generator 2, to raise the temperature of the water to the point required for its proper deaeration, so that this is put in condition for freezing in the cans of the tank 21, thus utilizing heat which has hitherto gone to waste.

I claim:

1. The combination in a refrigerating system, of a refrigerant compression device forming a source of heated gas, a condenser therefor, a de-aerator having a water supply, a heat exchanger in connection with said water supply, and connections for diverting heated gas from said compression device away from said condenser to said heat exchanger to raise the temperature of the water prior to its delivery to said deaerator.

2. The combination in a refrigerating system of a condenser for compressed gas; a heat exchanger, a source of compressed gas connected to the condenser, connections for diverting all or a part of said compressed gas to the heat exchanger; a source of water connected to deliver to the heat exchanger; a deaerator connected to receive water heated in the heat exchanger; and means for freezing the water, said means being connected to receive condensed refrigerant from the condenser and heat exchanger.

3. The combination in a refrigerating system of a compressor for refrigerant; a condenser for said refrigerant; a freezing tank; a brine tank connected to supply the freezing tank; means for cooling the brine in the brine tank; a connection between the condenser and the freezing tank for melting loose the ice formed therein; a storage tank connected to receive water after it has been used in the freezing tank; and means for delivering water from the storage tank to the condenser.

4. The combination in a refrigerating system of a source of heated refrigerant; a condenser and a heat exchanger both connected to receive heated gas from said source; means for delivering cooling water to the heat exchanger; a deaerator connected to receive water after it has been heated in the heat exchanger; a cooler for lowering the temperature of the water after its passage through the deaerator; and a freezing tank connected to receive water from said cooler; with a connection for delivering water from the condenser to the freezing tank for melting loose the ice formed therein.

WILLIAM E. HEXAMER.